US010950240B2

(12) United States Patent
Taki et al.

(10) Patent No.: US 10,950,240 B2
(45) Date of Patent: Mar. 16, 2021

(54) INFORMATION PROCESSING DEVICE AND INFORMATION PROCESSING METHOD

(71) Applicant: SONY CORPORATION, Tokyo (JP)

(72) Inventors: Yuhei Taki, Kanagawa (JP); Shinichi Kawano, Tokyo (JP)

(73) Assignee: SONY CORPORATION, Tokyo (JP)

(*) Notice: Subject to any disclaimer, the term of this patent is extended or adjusted under 35 U.S.C. 154(b) by 193 days.

(21) Appl. No.: 16/306,165

(22) PCT Filed: Aug. 14, 2017

(86) PCT No.: PCT/JP2017/029255
§ 371 (c)(1),
(2) Date: Nov. 30, 2018

(87) PCT Pub. No.: WO2018/037956
PCT Pub. Date: Mar. 1, 2018

(65) Prior Publication Data
US 2020/0327893 A1  Oct. 15, 2020

(30) Foreign Application Priority Data
Aug. 26, 2016  (JP) .............................. JP2016-165711

(51) Int. Cl.
*G10L 15/30* (2013.01)
*G10L 15/22* (2006.01)

(52) U.S. Cl.
CPC .............. *G10L 15/30* (2013.01); *G10L 15/22* (2013.01); *G10L 2015/228* (2013.01)

(58) Field of Classification Search
CPC ..... G10L 15/30; G10L 15/22; G10L 2015/228
USPC ........................................................ 704/231
See application file for complete search history.

(56) References Cited

U.S. PATENT DOCUMENTS

| 5,566,272 | A  | * | 10/1996 | Brems ..................... G10L 15/10 704/231 |
| 8,311,823 | B2 | * | 11/2012 | Bloebaum ............. G06F 16/951 704/235 |
| 8,510,103 | B2 | * | 8/2013  | Angott .................... G10L 15/10 704/205 |
| 8,924,213 | B2 | * | 12/2014 | Ganong, III ........... G10L 15/08 704/251 |
| 9,064,493 | B2 | * | 6/2015  | Ganong, III ........... G10L 15/08 |

(Continued)

FOREIGN PATENT DOCUMENTS

JP         2016109725 A  *  6/2016  ............. G06F 3/048

*Primary Examiner* — Edwin S Leland, III
(74) *Attorney, Agent, or Firm* — Paratus Law Group, PLLC

(57) ABSTRACT

There is provided an information processing device and an information processing method that enable a desired voice recognition result to be easily obtained. The information processing device includes a presentation control unit that controls a separation at a time of presenting a recognition result of voice recognition on the basis of context relating to voice recognition. The present technology can be applied, for example, to an information processing device that independently performs voice recognition, a server that performs voice recognition in response to a call from a client and transmits the recognition result to the client, or the client that requests voice recognition to the server, receives the recognition result from the server, and presents the recognition result.

14 Claims, 10 Drawing Sheets

(56) References Cited

U.S. PATENT DOCUMENTS

| | | | |
|---|---|---|---|
| 9,070,367 B1* | 6/2015 | Hoffmeister | G10L 15/063 |
| 9,437,186 B1* | 9/2016 | Liu | G10L 15/05 |
| 9,818,407 B1* | 11/2017 | Secker-Walker | G10L 15/32 |
| 2012/0022865 A1* | 1/2012 | Milstein | G10L 15/10 704/235 |
| 2014/0012575 A1* | 1/2014 | Ganong, III | G10L 15/1815 704/239 |
| 2014/0012579 A1* | 1/2014 | Ganong, III | G10L 15/08 704/257 |
| 2015/0269935 A1* | 9/2015 | Suessenguth | G10L 15/22 704/235 |
| 2017/0337920 A1* | 11/2017 | Kawano | G06F 3/048 |
| 2020/0327893 A1* | 10/2020 | Taki | G10L 15/30 |

* cited by examiner

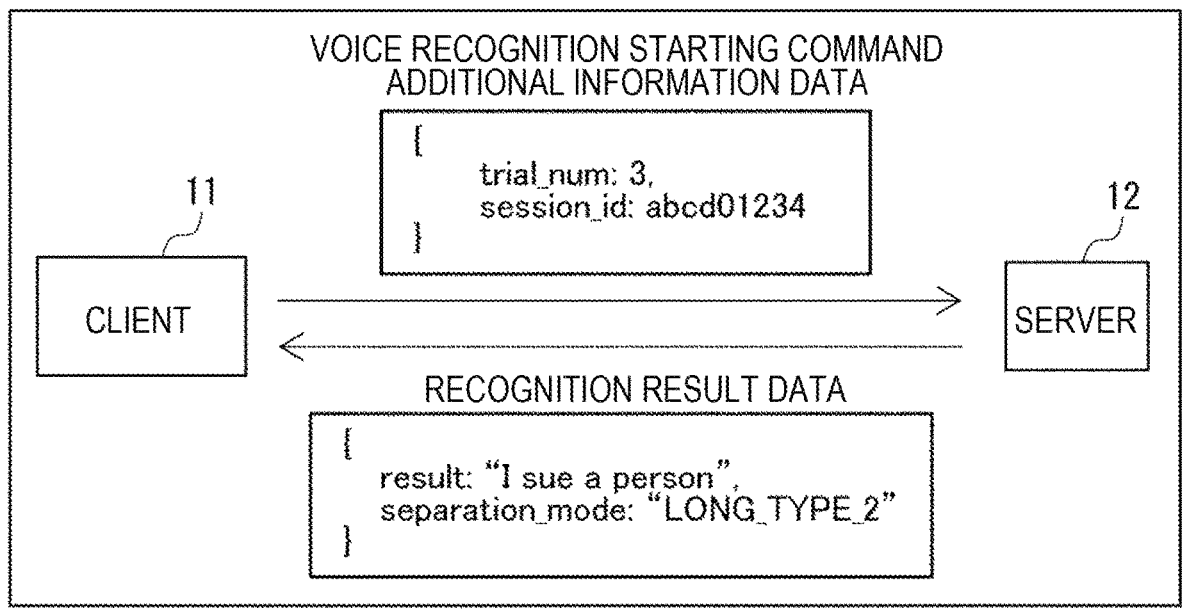
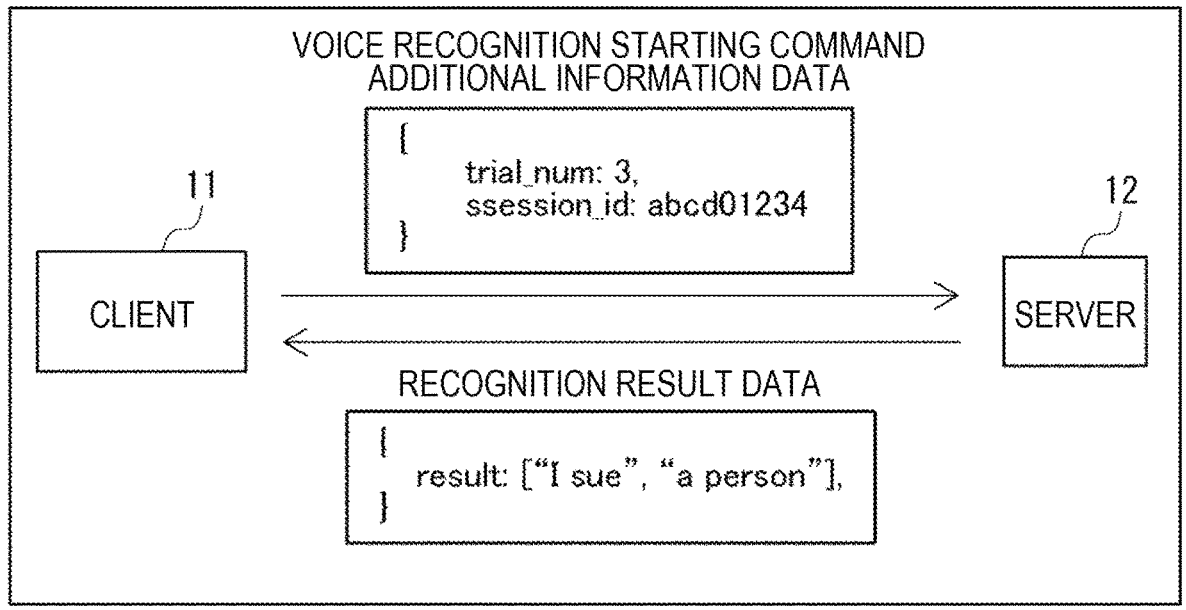

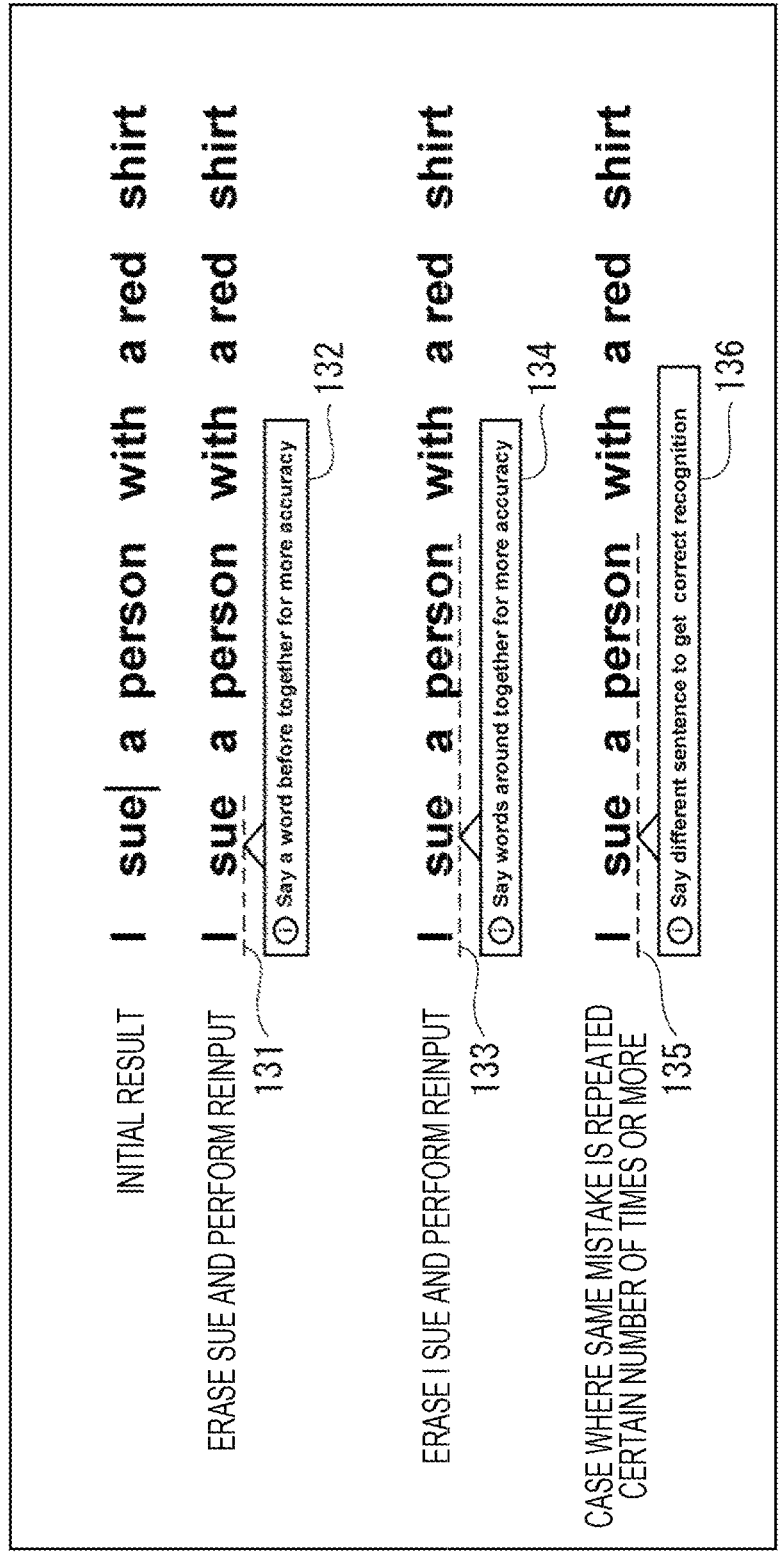

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2017/029255 (filed on Aug. 14, 2017) under 35 U.S.C. § 371, which claims priority to Japanese Patent Application No. 2016-165711 (filed on Aug. 26, 2016), which are all hereby incorporated by reference in their entirety.

TECHNICAL FIELD

The present technology relates to an information processing device and an information processing method, and more particularly to an information processing device and an information processing method that enable a desired voice recognition result to be easily obtained.

BACKGROUND ART

Presentation of a candidate to a user has been conventionally disclosed. In the presentation, a candidate having a maximum score in the first voice recognition is removed from candidate groups of recognition results for the first and second voice recognitions, and another candidate having a maximum score is selected from a candidate group, having larger score dispersion, of the first and second candidate groups after the removal (for example, see Patent Document 1).

CITATION LIST

Patent Document

Patent Document 1: Japanese Patent Application Laid-Open No. 2016-62069

SUMMARY OF THE INVENTION

Problems to be Solved by the Invention

Unfortunately, in the invention disclosed in Patent Document 1, voice inputs of the same sentence are required for the first and second trials, and a burden on a user increases as the sentence is elongated.

The present technology is then intended to enable a desired voice recognition result to be easily obtained.

Solutions to Problems

An information processing device in one aspect of the present technology includes a presentation control unit that controls a separation at a time of presenting a recognition result of voice recognition on the basis of context relating to voice recognition.

A unit in which the recognition result is allowed to be modified can be determined by a separation of the recognition result.

A voice recognition unit can be further provided, and the presentation control unit can control a separation of the recognition result presented by the voice recognition unit.

The presentation control unit can generate control information for controlling a separation of the recognition result, and output the recognition result and the control information.

A communication unit that receives input voice from another information processing device, and transmits the recognition result and the control information to the other information processing device can be further provided, and the voice recognition unit can perform voice recognition for the input voice, and the presentation control unit can control a separation at a time of presenting the recognition result in the other information processing device on the basis of the control information.

The communication unit can receive data indicating the context from the other information processing device, and the presentation control unit can control a separation at a time of presenting the recognition result in the other information processing device on the basis of data indicating the context.

A communication unit can be further provided, the communication unit can receive input voice and control information for controlling a separation of the recognition result from another information processing device, the voice recognition unit can perform voice recognition for the input voice, the presentation control unit can separate the recognition result presented by the voice recognition unit on the basis of the control information, and the communication unit can transmit the recognition result separated by the presentation control unit to the other information processing device.

A communication unit that transmits input voice to another information processing device, and receives the recognition result obtained by performing voice recognition for the input voice from the other information processing device can be further provided, and the presentation control unit can control a separation at a time of presenting the recognition result received from the other information processing device.

The communication unit can receive control information for controlling a separation of the recognition result from the other information processing device, and the presentation control unit can control a separation at a time of presenting the recognition result received from the other information processing device on the basis of the control information.

The communication unit can transmit control information for controlling a separation of the recognition result to the other information processing device, and receive the recognition result separated on the basis of the control information from the other information processing device, and the presentation control unit can control presentation of the recognition result separated by the other information processing device.

The context can contain the number of trials of voice recognition.

The presentation control unit can elongate a separation of the recognition result as the number of trials increases.

The presentation control unit can shorten a separation of the recognition result as the number of trials increases.

The context can contain at least one of a noise environment at a time of inputting voice, or a use of voice recognition.

A separation at a time of presenting a recognition result of voice recognition can be controlled on the basis of context relating to voice recognition.

An information processing method in one aspect of the present technology includes a presentation control step of controlling a separation at a time of presenting a recognition result of voice recognition on the basis of context relating to voice recognition.

In one aspect of the present technology, a separation at a time of presenting a recognition result of voice recognition is controlled on the basis of context relating to voice recognition.

Effects of the Invention

According to one aspect of the present technology, a recognition result of voice recognition can be separately presented. In particular, according to one aspect of the present technology, a desired voice recognition result can be easily obtained.

Note that the effects described here are not necessarily limited, and may correspond to one of the effects described in the disclosure.

BRIEF DESCRIPTION OF DRAWINGS

FIG. 9 illustrates a third example of data transmitted and received between the client and the server.

FIG. 10 illustrates a fourth example of data transmitted and received between the client and the server.

FIG. 11 illustrates a variation of a method of presenting a recognized sentence.

MODE FOR CARRYING OUT THE INVENTION

Figure 1:
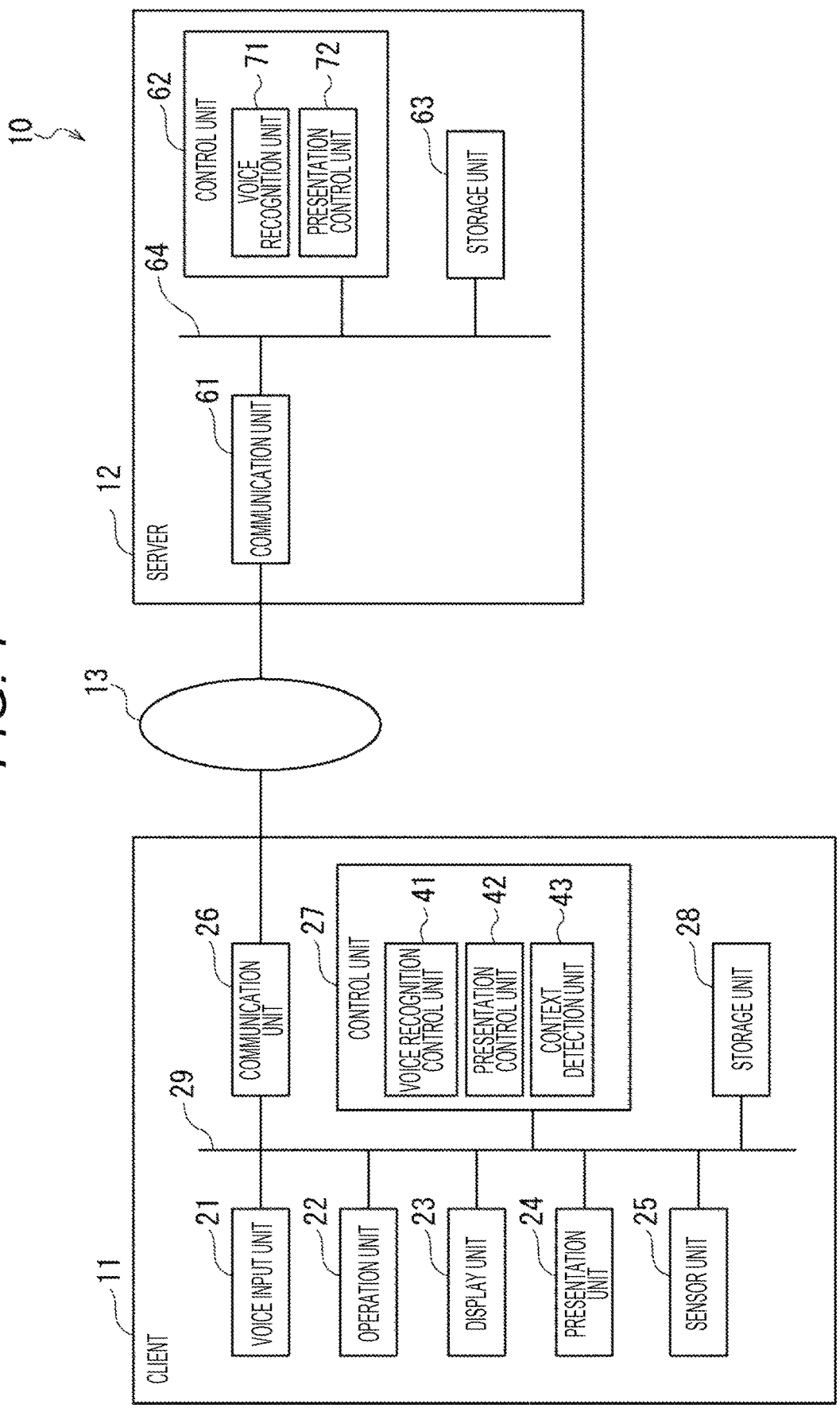
FIG. 1 is a block diagram illustrating one embodiment of an information processing system to which the present technology is applied.

Embodiments for carrying out the invention (hereinafter referred to as "embodiments") will now be described in detail with reference to the drawings. Note that the description will be given in the following order.
1. Embodiments
2. Variations
3. Applications 1. Embodiments 1-1. Configuration Example of Information Processing System First, a configuration example of an information processing system 10 to which the present technology is applied will first be described with reference to FIG. 1.

The information processing system 10 is a system that performs voice recognition for input voice input by a user and presents the recognition result. The information processing system 10 includes a client 11, a server 12, and a network 13. The client 11 and the server 12 are mutually connected via the network 13.

Note that, although only one client 11 is illustrated in the figure, a plurality of clients 11 can be connected to the network 13 in practice, and a plurality of users can use the information processing system 10 via the clients 11.

The client 11 transmits input voice input by a user to the server 12, receives a voice recognition result for the input voice from the server 12, and presents the result.

For example, the client 11 includes portable information terminals, such as smartphones, tablets, mobile phones, and notebook personal computers, wearable devices, desktop personal computers, game machines, moving picture reproducing apparatuses, music reproducing devices and the like. Furthermore, the wearable devices can adopt various types, for example, eyeglass, wristwatch, bracelet, necklace, neckband, earphone, headset, head mount types, and the like.

The client 11 includes a voice input unit 21, an operation unit 22, a display unit 23, a presentation unit 24, a sensor unit 25, a communication unit 26, a control unit 27, and a storage unit 28. The control unit 27 includes a voice recognition control unit 41, a presentation control unit 42, and a context detection unit 43. The voice input unit 21, the operation unit 22, the display unit 23, the presentation unit 24, the sensor unit 25, the communication unit 26, the control unit 27, and the storage unit 28 are mutually connected via a bus 29.

The voice input unit 21 includes, for example, a microphone. Any number of microphones can be set. The voice input unit 21 collects, for example, voice uttered by the user, supplies voice data indicating the collected voice to the control unit 27, and causes the storage unit 28 to store the voice data.

The operation unit 22 includes various operation members, and is used for operating the client 11. For example, the operation unit 22 includes a controller, a remote controller, a touch panel, a hardware button, and the like.

The display unit 23 includes, for example, a display. The display unit 23 displays images, such as a screen image indicating the voice recognition result, graphical user interface (GUI), and screen images for various application programs and service, under the control of the presentation control unit 42.

The presentation unit 24 includes, for example, a speaker, a vibration device, other cooperative devices, and the like. The presentation unit 24 presents, for example, the voice recognition result under the control of the presentation control unit 42.

The sensor unit 25 includes a camera, a distance sensor, a global positioning system (GPS) receiver, and various sensors such as an acceleration sensor, a gyro sensor and the like. The sensor unit 25 supplies sensor data indicating a detection result of each sensor to the control unit 27, and causes the storage unit 28 to store the sensor data.

The communication unit 26 includes various communication devices. The communication method of the communication unit 26 is not particularly limited, and both wireless and wired communications are applicable. Furthermore, the communication unit 26 may be compliant with a plurality of communication methods. The communication unit 26 communicates with the server 12 via the network 13, and transmits and receives various pieces of data. The communication unit 26 supplies the data received from the server 12 to the control unit 27, and causes the storage unit 28 to store the received data.

The control unit 27 includes, for example, various processors, and the like.

The voice recognition control unit 41 acquires data necessary for processing of a voice recognition unit 71 of the server 12, and transmits the data to the server 12 via the communication unit 26 and the network 13. Furthermore, the voice recognition control unit 41 receives, for example, the recognition result of the voice recognition from the server 12 via the communication unit 26 and the network 13.

The presentation control unit 42 controls presentation of, for example, various pieces of information through the display unit 23 and the presentation unit 24.

The context detection unit 43 detects context relating to execution of the voice recognition (hereinafter also referred to as execution context) on the basis of, for example, the voice data from the voice input unit 21, the sensor data from the sensor unit 25, and programs executed by the control unit 27. For example, the context detection unit 43 detects, for example, a noise environment around the client 11, a use of the voice recognition, and the like.

The storage unit 28 stores, for example, programs and data necessary for processing of the client 11.

The server 12 performs voice recognition for input voice received from the client 11, and transmits the recognition result to the client 11 via the network 13. The server 12 includes a communication unit 61, a control unit 62, and a storage unit 63. The control unit 62 includes the voice recognition unit 71 and a presentation control unit 72. The communication unit 61, the control unit 62, and the storage unit 63 are mutually connected via a bus 64.

The communication unit 61 includes various communication devices. The communication method of the communication unit 61 is not particularly limited, and both wireless and wired communications are applicable. Furthermore, the communication unit 61 may be compliant with a plurality of communication methods. The communication unit 61 communicates with the client 11 via the network 13, and transmits and receives various pieces of data. The communication unit 61 supplies the data received from the client 11 to the control unit 62, and causes the storage unit 63 to store the received data.

The control unit 62 includes, for example, various processors, and the like.

The voice recognition unit 71 performs voice recognition for the input voice acquired from the client 11.

The presentation control unit 72 controls presentation of the voice recognition result in the client 11. For example, the presentation control unit 72 controls a separation at a time of presenting the recognition result from the voice recognition unit 71 in the client 11.

The storage unit 63 stores, for example, programs and data necessary for the processing of the server 12.

Note that the description of "via the network 13" will hereinafter be omitted in a case where the client 11 (communication unit 26) and the server 12 (communication unit 61) communicate via the network 13. The description of "via the bus 29" will hereinafter be omitted in a case where each unit of the client 11 communicates data via the bus 29. The description of "via the bus 64" will hereinafter be omitted in a case where each unit of the server 12 communicates data via the bus 64.

1-2. First Embodiment of Processing of Information Processing System 10

Next, the first embodiment of the processing of the information processing system 10 will be described with reference to FIGS. 2 to 6.

(Processing of Client 11)

The processing of the client 11 will first be described with reference to the flowchart of FIG. 2. Note that the processing is started, for example, when a user inputs an instruction to execute voice recognition via an operation unit 22.

In step S1, a context detection unit 43 detects context (execution context) relating to execution of the voice recognition.

For example, the context detection unit 43 detects a noise environment around the client 11, in other words, a noise environment at a time when the user inputs voice, on the basis of voice data from a voice input unit 21 and sensor data from a sensor unit 25. For example, the context detection unit 43 classifies the noise environment into three levels of good, average, and bad, on the basis of, for example, the noise level around the client 11, the current position of the client 11, and the like. For example, the noise environment is determined to be good in a case where the noise level is less than a predetermined first threshold value, average in a case where the noise level is equal to or greater than the first threshold value and less than a predetermined second threshold value, and poor in a case where the noise level is equal to or greater than the second threshold value. Furthermore, for example, the noise environment is determined to be good in a case where the current position of the client 11 is in a place that is expected to have a small noise amount (for example, home, or the like), average in a case where the current position of the client 11 is in a place that is expected to have an average noise amount (for example, inside of a vehicle, or the like), and poor in a case where the current position of the client 11 is in a place that is expected to have a large noise amount (for example, station, or the like).

Furthermore, the context detection unit 43 detects a use of voice recognition on the basis of, for example, programs and services that use voice recognition. For example, the use of the voice recognition is classified into, for example, input of a password or a user ID, input of a keyword to a search engine, input of a sentence of a chat, input of a sentence of a mail, and the like.

In step S2, the presentation control unit 42 sets an initial value of a separation mode.

Here, the separation mode means a mode for setting a position to separate a sentence obtained as a recognition result of voice recognition (hereinafter referred to as a recognized sentence) at a time of presenting the recognized sentence. A position to separate the recognized sentence determines a unit in which the recognized sentence can be modified (hereinafter referred to as a modification unit). In other words, the recognized sentence is divided into a plurality of modification units by dividing the recognized sentence. The user can modify the recognized sentence on modification-unit basis.

Note that the recognized sentence does not necessarily be one completed sentence, and may be, for example, a sequence of one or more words which do not constitute a completed sentence. Alternatively, the recognized sentence may include two or more sentences.

Figure 3:
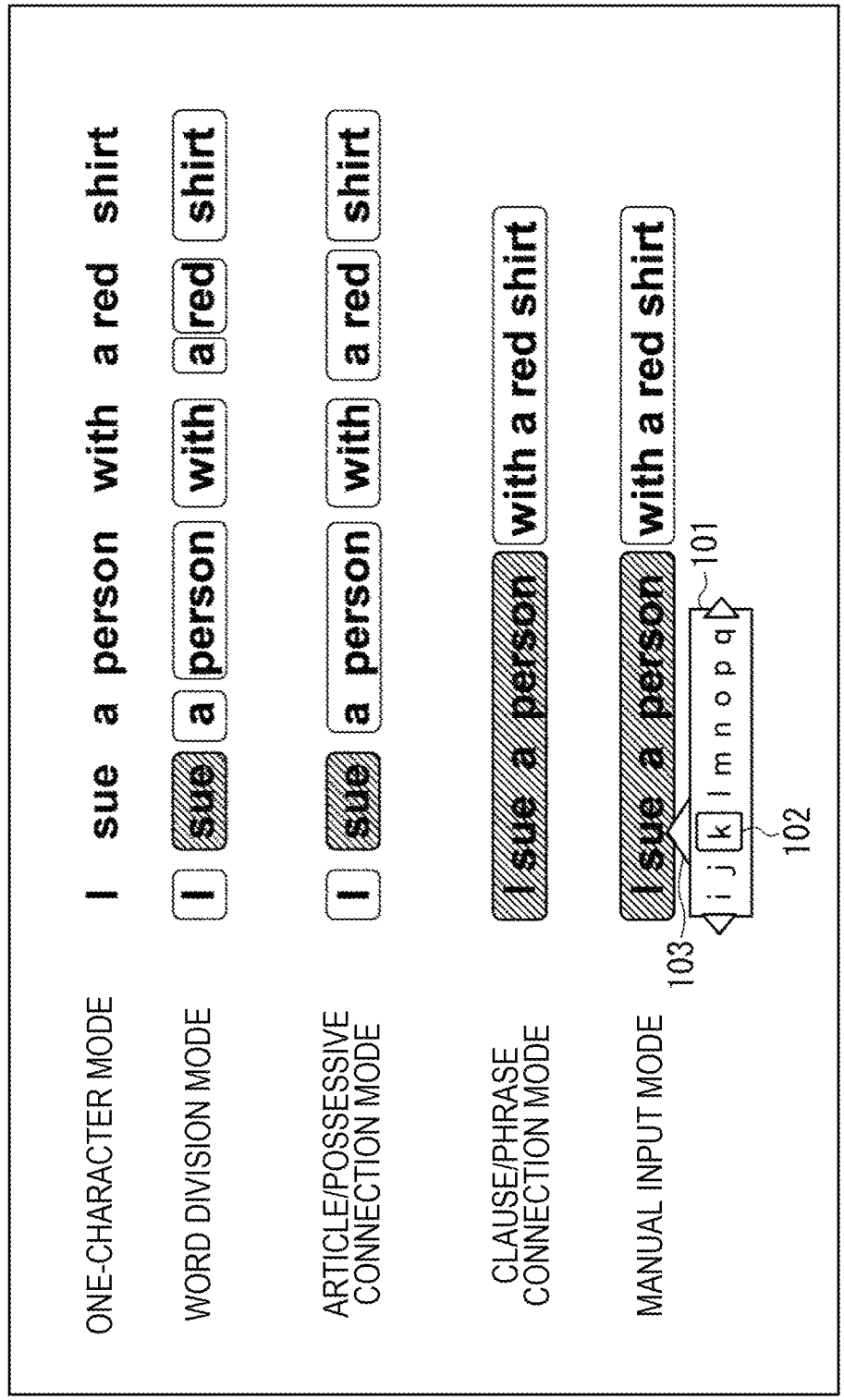
FIG. 3 illustrates an example of a separation mode.

FIG. 3 illustrates examples of the separation modes. The examples illustrate four types of separation modes: one-character mode, word division mode, article/possessive connection mode, and clause/phrase connection mode. A manual input mode is a mode different from the separation modes, and the details will be described later. Note that the examples illustrate a case where a recognition result "I sue a person with a red shirt" is obtained when the user inputs voice "I see a person with a red shirt".

In the one-character mode, each character of the recognized sentence is presented independently one by one without being connected. Consequently, each character of the recognized sentence is defined as the modification unit, and the user can modify the recognized sentence by the character. Note that, in the one-character mode, a voice recognition engine different from that used in other separation modes is used.

In the word division mode, the recognized sentence is presented separately on word basis. Consequently, each word of the recognized sentence is defined as the modification unit, and the user can modify the recognized sentence by the word.

In the article/possessive connection mode, the recognized sentence is presented separately on word basis basically in a manner similar to the word division mode. An article ("a", "the", and the like) or a possessive (for example, "my", "your", and the like), and the next word are, however, connected to be presented. For example, in the example of FIG. 4, "a" and "person", and "a" and "red" are connected to be presented. Thus, in a case where an article or a possessive is placed before a word, a range obtained by connecting the article or the possessive, and the word is defined as a modification unit, and in a case where no article and possessive are placed before a word, the word is dependently defined as a modification unit.

In the clause/phrase connection mode, the recognized sentence is presented separately on clause or phrase basis. For example, in the example of FIG. 4, the recognized sentence is presented while being separated into a clause "I sue a person" and a noun phrase "with a red shirt". Consequently, each phrase or each clause of the recognized sentence is defined as a modification unit, and the user can modify the recognized sentence by the phrase or clause.

Note that the modification unit indicated by slanted lines in each of the separation modes indicates the modification unit on which a cursor is placed.

Furthermore, in each of the separation modes, insertion of a recognition result of voice recognition by an insertion mode and overwriting by an overwrite mode are possible in a case of modifying the recognized sentence.

A recognition result of input voice is inserted to a position of a cursor (not illustrated) by inputting voice with the cursor placed, for example, at the head of the recognized sentence, between adjacent modification units, or the end of the recognized sentence. For example, in a case where the cursor is placed between "sue" and "a" in the word division mode in FIG. 3, the recognition result of the input voice is inserted between "sue" and "a".

Furthermore, the recognition result of the input voice is written over at a position of the cursor by inputting voice with the cursor placed, for example, on one of the modification units of the recognized sentence. For example, in a case where the cursor is placed on "I sue a person" as in the clause/phrase connection mode in FIG. 3, the recognition result of the input voice is written over on "I sue a person".

Moreover, in each of the separation modes, a character or a phrase of the recognized sentence can be deleted on modification-unit basis.

Furthermore, the separation modes are arranged in the order of the one-character mode, the word division mode, the article/possessive connection mode, and the clause/phrase connection mode, from bottom. In other words, a lower level of separation mode has shorter modification units, and a higher level of separation mode has longer modification units.

Moreover, the separation mode transits basically from bottom to top. The one-character mode is, however, an independent mode, and no separation mode next to the one-character mode exists. As will be described later, the separation mode thus transits basically in the order of the word division mode, the article/possessive connection mode, and the clause/phrase connection mode. Next to the clause/phrase connection mode, the separation mode transits to the manual input mode. In contrast, next to the one-character mode, transition to the manual input mode is performed without transition to another separation mode.

Note that a longer modification unit and more words contained in the modification unit enables voice recognition based on the correlation between words, thereby generally improving recognition accuracy. Consequently, an upper level of separation mode has an improved accuracy of voice recognition in a case of modifying a recognition result, and has higher possibility of appropriate modification.

The presentation control unit 42 sets the initial value of the separation mode on the basis of the execution context.

For example, the presentation control unit 42 sets the initial value of the separation mode on the basis of a use of the voice recognition. For example, in a case where the voice recognition is used for inputting, for example, a user name, an ID, or the like, in other words, in a case where a meaningful sentence and phrase are unlikely to be input, the initial value of the separation mode is set to the one-character mode. Alternatively, in a case where the voice recognition is used for inputting a search keyword in a search site, in other words, in a case where a short phrase is likely to be input, the initial value of the separation mode is set to the word separation mode. Alternatively, in a case where the voice recognition is used for inputting a sentence of mail, in other words, in a case where input voice is input by the sentence, and accuracy is more important than speed, the initial value of the separation mode is set to the article/possessive connection mode. Alternatively, in a case where the voice recognition is used for inputting a sentence of a chat, in other words, in a case where input voice is input by the sentence, and speed is more important than accuracy, the initial value of the separation mode is set to the clause/phrase connection mode.

Furthermore, for example, the presentation control unit 42 sets the initial value of the separation mode on the basis of a surrounding noise environment. For example, in a case where the surrounding noise environment is good, the initial value of the separation mode is set to the word separation mode. Alternatively, in a case where the surrounding noise environment is average, the initial value of the separation mode is set to the article/possessive connection mode. Alternatively, in a case where the surrounding noise environment is poor, the initial value of the separation mode is set to the clause/phrase connection mode.

Note that the presentation control unit 42 may set the initial value of the separation mode by using another type of context, or combining a plurality of pieces of context. Furthermore, for example, the presentation control unit 42 may fix the initial value of the separation mode regardless of context.

In step S3, a voice recognition control unit 41 requests execution of voice recognition. Specifically, the voice recognition control unit 41 generates a voice recognition starting command that is a command giving instruction to start voice recognition. Furthermore, the voice recognition control unit 41 adds additional information data to the voice recognition starting command as necessary. Although details of the additional information data will be described later, for example, context relating to voice recognition (for example, the number of trials, or the like) is contained. The voice recognition control unit 41 transmits the voice recognition starting command to a server 12 via a communication unit 26.

The server 12 receives the voice recognition starting command in the later-described step S51 in FIG. 4.

In step S4, the client 11 receives voice input. For example, the presentation control unit 42 controls a display unit 23 or a presentation unit 24, and prompts the user to input voice. The voice recognition control unit 41 then acquires voice data indicating input voice input by the user to a voice input unit 21, and transmits the acquired voice data to the server 12 via the communication unit 26.

The server 12 receives the voice data in the later-described step S52 in FIG. 4, performs voice recognition on the basis of the voice data, and transmits recognition result data indicating the recognition result to the client 11 in step S53.

In step S5, the voice recognition control unit 41 receives the recognition result. In other words, the voice recognition control unit 41 receives the recognition result data transmitted from the server 12 via the communication unit 26.

In step S6, the display unit 23 presents the recognition result in the set separation mode under the control of the presentation control unit 42. In other words, the recognized sentence is presented in one separation mode of the one-character mode, the word division mode, the article/possessive connection mode, and the clause/phrase connection mode, as described above with reference to FIG. 3. Note that, in the first processing of step S6, the recognized sentence is presented in the separation mode set in the processing of step S2. In contrast, in the second and subsequent processing of step S6, the recognized sentence is presented in the separation mode set in the processing of the later-described step S10.

Note that, in a case where the separation mode is changed, display is smoothly changed by using, for example, animation, or the like so as not to give sense of incompatibility to the user.

In step S7, the voice recognition control unit 41 determines whether or not a sound recognition result needs modification. For example, in a case where the user performs operation for modifying the presented recognized sentence via the operation unit 22, the voice recognition control unit 41 determines that the recognition result needs modification. The processing proceeds to step S8.

In step S8, the presentation control unit 42 determines whether or not change to the manual input mode is to be performed. For example, in a case where the number of trials of the voice recognition has not reached a specified value, and the recognized sentence is presented while being separated into two or more pieces, the presentation control unit 42 determines the change to the manual input mode is not performed. The processing proceeds to step S9.

In step S9, the presentation control unit 42 changes the separation mode as necessary. Specifically, in a case where the voice recognition has already been tried a predetermined number of times in the current separation mode, the presentation control unit 42 changes the separation mode to the mode next to the current mode. In contrast, in a case where the voice recognition has not yet been tried a predetermined number of times in the current separation mode, the presentation control unit 42 does not change the separation mode.

For example, in a case where the voice recognition is to be tried twice in each of the separation modes, and the voice recognition has already been tried twice in the current separation mode, the separation mode is set to the next mode. In contrast, in a case where the voice recognition has been tried only once in the current separation mode, the separation mode is not changed. Note that the voice recognition is to be tried once in each of the separation modes, the separation mode is automatically set to the next mode.

In step S10, execution of the voice recognition is requested in a manner similar to the processing of step S3.

In step S11, voice input is received in a manner similar to the processing of step S4.

Note that, since the modification unit is different in each of the separation modes as described above, a range for which the user input voice for modifying the recognition result is different. For example, in a case of modifying "sue" in the above-described example in FIG. 3, the user inputs voice of a phrase to be substituted for "sue" in the word division mode or the monitoring/possessive connection mode. In contrast, the user inputs voice of a phrase to be substituted for "I sue a person" in the clause/phrase connection mode.

In this way, in a lower level mode, a range for which the user reinputs voice is shorter, and a burden on the user is reduced.

In contrast, in an upper level mode, the range for which the user reinputs the voice is longer. Accuracy of voice recognition is thus improved, and a desired recognition result is more likely to be obtained. Furthermore, even in the upper level mode, the user does not need to reinput voice of all sentence, whereby the burden on the user is reduced.

In step S12, the recognition result is received in a manner similar to the processing of step S5.

Thereafter, the processing returns to step S6, and the pieces of processing of steps S6 to S12 are repeatedly executed until the recognition result is determined to need no modification in step S7, or change to the manual input mode is determined to be performed in step S8.

In contrast, in step S8, for example, in a case where the number of trials of the voice recognition has reached a specified value, in other words, in a case where a desired recognition result is unlikely to be obtained by further trials of the voice recognition, the presentation control unit 42 determines the change to the manual input mode is to be performed. Furthermore, for example, in a case where the recognized sentence is presented without a separation, in other words, in a case where voice of all sentence is needed to be reinput, and a result similar to the original recognition result is likely to be obtained, the presentation control unit 42 determines the change to the manual input mode is to be performed. In a case where the change to the manual input mode is determined to be performed, the processing then proceeds to step S13.

In step S13, the presentation control unit 42 performs setting to the manual input mode. Specifically, the presentation control unit 42 controls the display unit 23, and displays a character input bar 101 as indicated in the example of the manual input mode in FIG. 3.

In step S14, the voice recognition control unit 41 receives modification of the recognition result through a manual input. Specifically, the user inputs a character with the character input bar 101, and modifies the recognized sentence. In the character input bar 101, characters in a cursor 102 can be switched by scrolling the characters in the left and right direction. Furthermore, the character input bar 101 can be moved to a desired position of the recognized sentence. In a case where an input of a character in the cursor 102 is confirmed with a pointer 103 of the character input bar 101 indicating one of the characters of the recognized sentence, the character indicated by the pointer 103 is then written over by the confirmed character. In contrast, in a case where an input of a character in the cursor 102 is confirmed with the pointer 103 indicating the head, a position between characters, or the end of the recognized sentence, the confirmed character is inserted to the position of the pointer 103.

The voice recognition control unit 41 then modifies the recognized sentence according to the user input. Furthermore, the display unit 23 presents the modified recognized sentences under the control of the presentation control unit 42.

Thereafter, the processing proceeds to step S15.

In contrast, in step S7, for example, in a case where the user performs operation of confirming the recognized sentence, or operation for performing voice recognition for the next sentence via the operation unit 22, the voice recognition control unit 41 determines that the recognition result needs no modification. The processing proceeds to step S15.

In step S15, the voice recognition control unit 41 confirms the recognition result. For example, the voice recognition control unit 41 then causes a storage unit 28 to store the confirmed recognition result, and transmits the result to another device via the communication unit 26.

In step S16, the voice recognition control unit 41 determines whether or not the voice recognition is to be continued. For example, in a case where the user performs operation for performing voice recognition for the next sentence via the operation unit 22, the voice recognition control unit 41 determines that the voice recognition is to be continued. The processing returns to step S2.

Thereafter, the pieces of processing of steps S2 to S16 are repeatedly executed until the voice recognition is determined to be finished in step S16.

In contrast, in a case where the user performs operation for finishing the voice recognition via the operation unit 22 in step S16, the voice recognition control unit 41 determines that the voice recognition is to be finished. The processing of the client 11 is finished.

(Processing of Server 12)

Next, the processing executed by the server 12 will be described in correspondence with the processing of the client 11 in FIG. 2 with reference to the flowchart of FIG. 4.

In step S51, a voice recognition unit 71 determines whether or not execution of voice recognition is requested. The voice recognition unit 71 repeatedly executes the processing of step S51 at predetermined timing until the execution of the voice recognition is determined to be requested. When receiving, via a communication unit 61, a voice recognition starting command transmitted from the client 11 in step S3 or S10 in FIG. 2, the voice recognition unit 71 then determines that the execution of the voice recognition is requested. The processing proceeds to step S52.

In step S52, the voice recognition unit 71 performs the voice recognition. Specifically, the voice recognition unit 71 receives voice data transmitted from the client 11 in step S4 or S11 in FIG. 2 via the communication unit 61. The voice recognition unit 71 performs the voice recognition of input voice indicated by the received voice data. Furthermore, the voice recognition unit 71 calculates the reliability of a recognition result.

In step S53, a presentation control unit 72 transmits the recognition result. Specifically, the presentation control unit 72 generates recognition result data containing a recognized sentence indicating the recognition result. Note that the recognition result data can contain, for example, the reliability of the recognition result, and the like. The presentation control unit 72 transmits the recognition result data to the client 11 via the communication unit 61.

Thereafter, the processing returns to step S51, and the pieces of processing after step S51 are executed.

Figure 2:
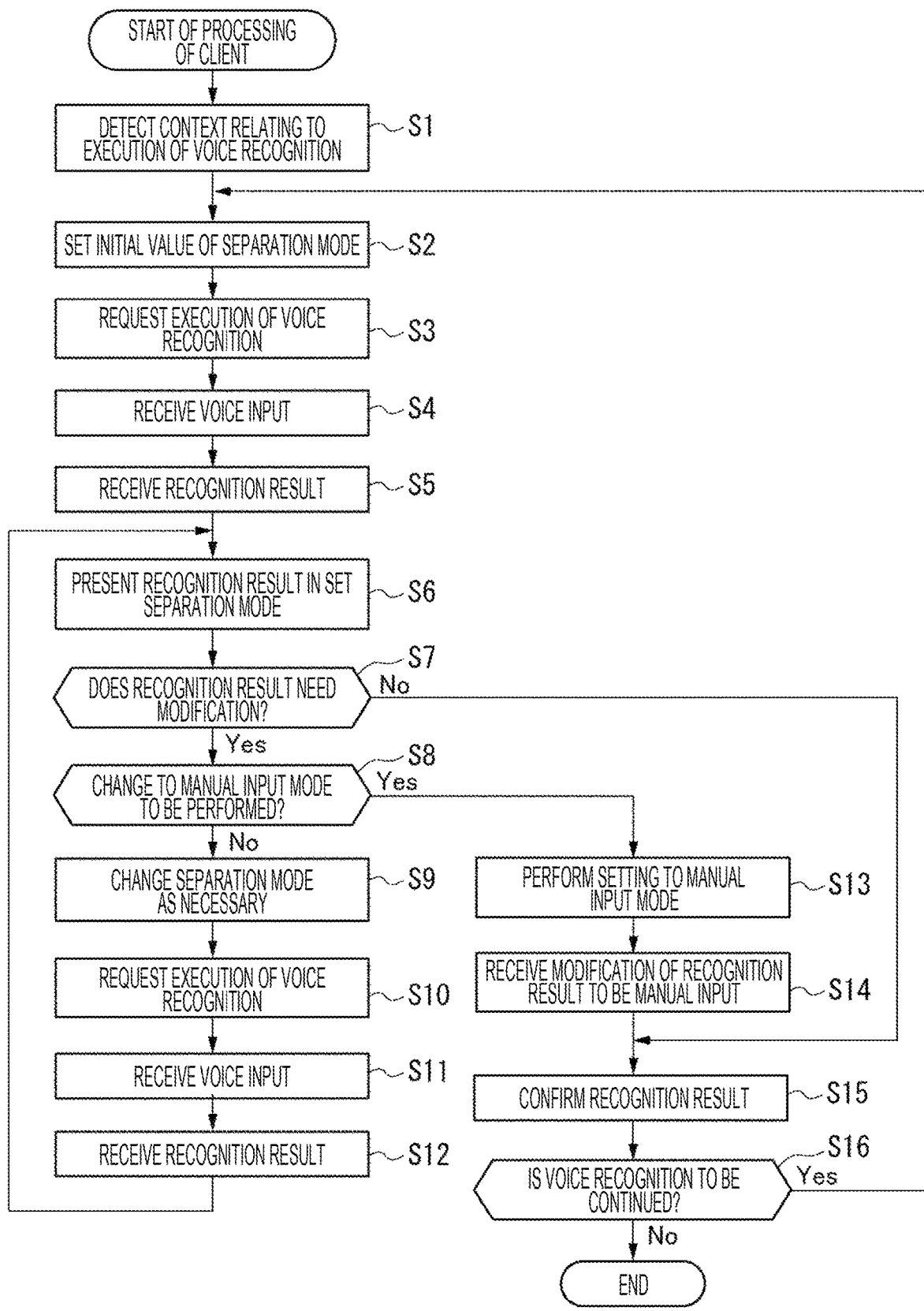
FIG. 2 is a flowchart for illustrating a first embodiment of processing of a client.
Figure 4:
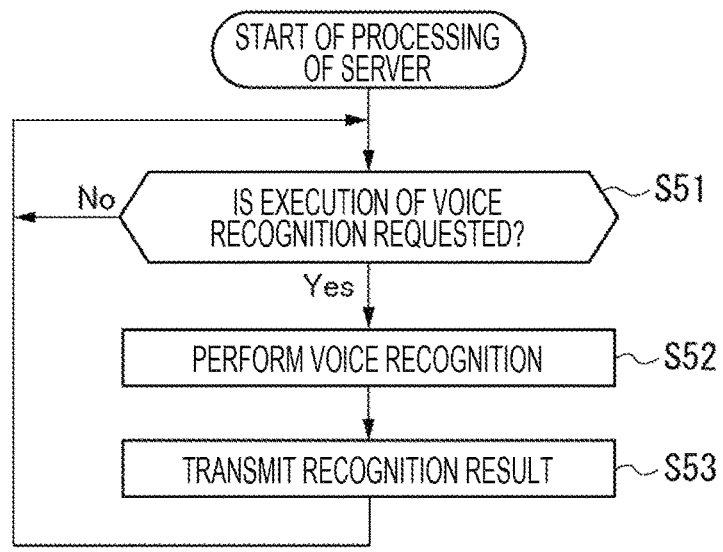
FIG. 4 is a flowchart for illustrating a first embodiment of processing of a server.
Figure 5:
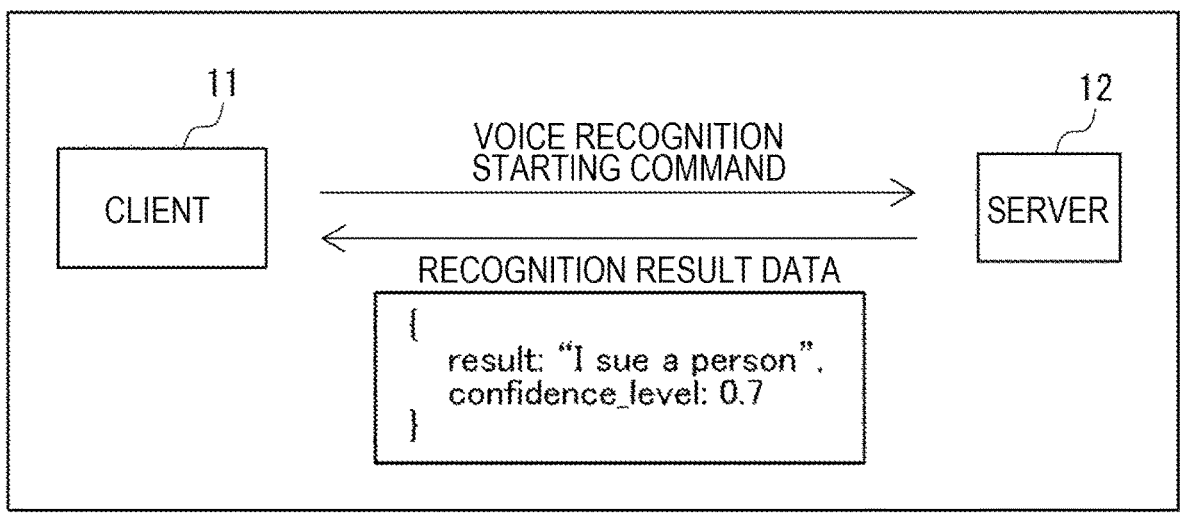
FIG. 5 illustrates a first example of data transmitted and received between the client and the server.
Figure 6:
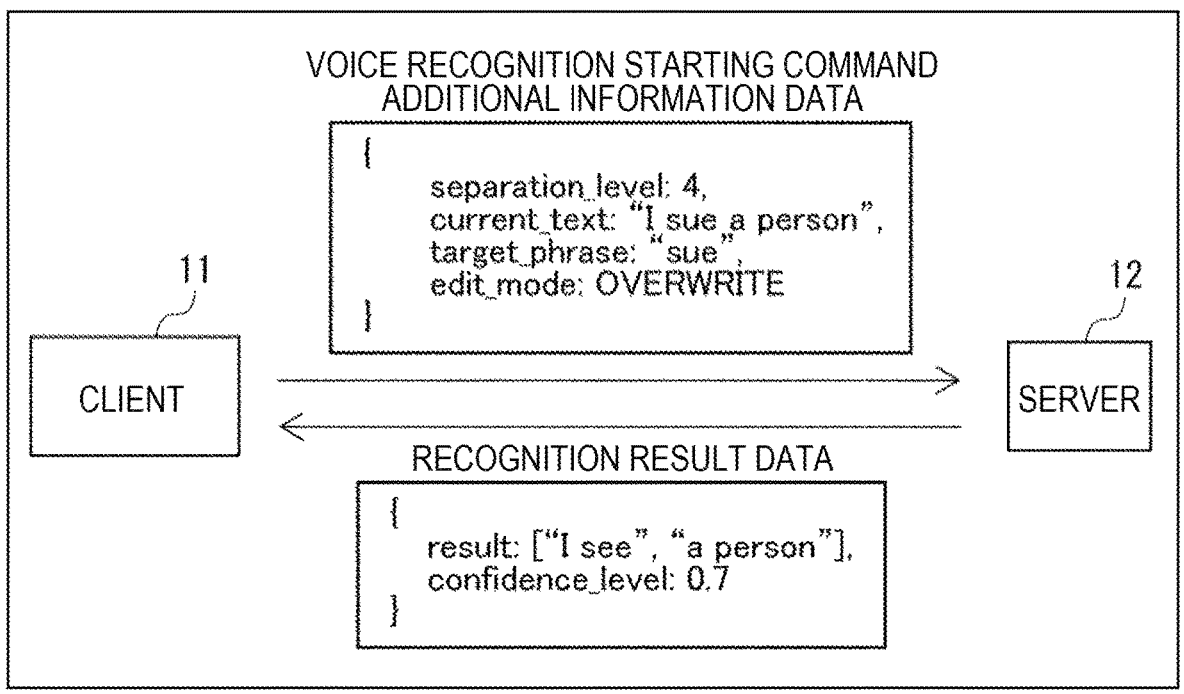
FIG. 6 illustrates a second example of data transmitted and received between the client and the server.

FIGS. 5 and 6 illustrate examples of data transmitted and received between the client 11 and the server 12 in the pieces of processing of FIGS. 2 and 4.

In the example of FIG. 5, a voice recognition starting command not containing additional information data is transmitted from the client 11 to the server 12.

In contrast, recognition result data is transmitted from the server 12 to the client 11. The recognition result data is compliant with, for example, JavaScript (registered trademark) Object Notation (JSON), and contains result and confidence_level. The result indicates the recognition result. The confidence_level indicates the reliability of the recognition result. In the example, the recognition result (recognized sentence) set in the result is not separated. The client 11 thus separately presents the recognition result in accordance with a separation mode.

In the example of FIG. 6, a voice recognition starting command containing additional information data is transmitted from the client 11 to the server 12. The additional information data is compliant with, for example, JSON, and contains separation_level, current_text, target_phrase, and edit_mode. The separation_level indicates the separation mode set by the client 11, and is separation control information for controlling a separation at a time of presenting the recognized sentence. The current_text indicates the current recognition result of a modification range set by the user. Note that the modification range is set on modification-unit basis. The target_phrase indicates a phrase, in the current_text, to be modified by inputting voice. The example illustrates a case where the phrase to be modified is "sue". The edit_mode indicates a modification mode. For example, the edit_mode is set to "OVERWRITE" in an overwrite mode, and to "INSERT" in an insertion mode.

In contrast, recognition result data is transmitted from the server 12 to the client 11. The recognition result data contains result and confidence_level in a manner similar to the example in FIG. 5. Here, in a case where "see" is obtained as the recognition result, the server 12 generates a recognition result to be transmitted to the client 11 by replacing "sue" with "see". The "sue" is a target_phrase in "I sue a person", and the "I sue a person" is current_text of the additional information data. Furthermore, the server 12 (presentation control unit 72) separates the recognition result into "I see" and "a person" according to the separation_level (separation mode) specified by the client 11, and sets the recognition result to the result of the recognition result data.

In this configuration, the client 11 can present the recognition result in the separation mode set by the client 11 by presenting the recognition result while keeping the separation indicated by the result of the recognition result data.

In this way, a position of a separation at a time of presenting the recognition result (recognized sentence) is changed on the basis of context (for example, the number of trials, execution context, and the like) relating to the voice recognition, and the modification unit is changed. This configuration can appropriately narrow the range for which the user inputs voice for modifying the recognition result, and a burden on the user is reduced. Furthermore, it can be expected that narrowing the input range of voice causes the user to carefully input voice compared to, for example, the case where the entire sentence is input, and recognition accuracy is improved.

Moreover, as the number of trials increases, the recognition accuracy is improved by elongating the modification unit, and the user can rapidly obtain a desired recognition result.

1-3. Second Embodiment of Processing of Information Processing System 10

Next, the second embodiment of the processing of the information processing system 10 will be described with reference to FIGS. 7 to 10. Note that, although, in the first embodiment, the client 11 sets a separation mode, a server 12 sets the separation mode in the second embodiment.

(Processing of Client 11)

The processing of a client 11 will first be described with reference to the flowchart of FIG. 7. Note that the processing is started, for example, when a user inputs an instruction to execute voice recognition via an operation unit 22.

In step S101, context (execution context) relating to execution of voice recognition is detected in a manner similar to the processing of step S1 in FIG. 2.

In step S102, a voice recognition control unit 41 requests execution of voice recognition. Specifically, the voice recognition control unit 41 generates a voice recognition starting command. Furthermore, the voice recognition control unit 41 adds additional information data to the voice recognition starting command as necessary. Although details of the additional information data will be described later, for example, context relating to voice recognition (for example, the number of trials and execution context) is contained. The voice recognition control unit 41 transmits the voice recognition starting command to a server 12 via a communication unit 26.

The server 12 receives the voice recognition starting command in the later-described step S151 in FIG. 8.

In step S103, voice input is received in a manner similar to the processing of step S4 in FIG. 2.

The server 12 receives voice data in the later-described step S152 in FIG. 8, performs voice recognition on the basis of the voice data, and transmits recognition result data indicating the recognition result to the client 11 in step S158. Note that the recognition result data contains separation control information for indicating a separation mode and controlling a separation at a time of presenting the recognized sentence.

In step S104, the recognition result is received in a manner similar to the processing of step S5 in FIG. 2.

In step S105, a display unit 23 presents the recognition result in the specified separation mode under the control of the presentation control unit 42. In other words, the presentation control unit 42 sets the separation mode on the basis of separation control information contained in the recognition result data received from the server 12, and controls the display unit 23 such that the recognized sentence is presented in the set separation mode.

In step S106, it is determined whether or not the recognition result needs modification in a manner similar to the processing of step S7 in FIG. 2. In a case where the recognition result is determined to need modification, the processing proceeds to step S107.

In step S107, execution of the voice recognition is requested in a manner similar to the processing of step S102.

In step S108, voice input is received in a manner similar to the processing of step S11 in FIG. 2.

In step S109, the recognition result is received in a manner similar to the processing of step S12 in FIG. 2.

In step S110, the presentation control unit 42 determines whether or not a manual input mode is specified on the basis of separation control information contained in the recognition result data received from the server 12. In a case where the manual input mode is determined not to be specified, the processing returns to step S105.

Thereafter, pieces of processing of steps S105 to S110 are repeatedly executed until the recognition result is determined to need no modification in step S106, or the manual input mode is determined to be specified in step S110.

In contrast, in a case where the manual input mode is determined to be specified in step S110, the processing proceeds to step S111.

In step S111, the display unit 23 presents the recognition result in the manual input mode under the control of the presentation control unit 42. In other words, as illustrated in the above-described FIG. 3, the recognized sentence is presented together with a character input bar 101.

In step S112, it is determined whether or not the recognition result needs modification in a manner similar to the processing of step S7 in FIG. 2. In a case where the recognition result is determined to need modification, the processing proceeds to step S113.

In step S113, modification of the recognition result through a manual input is received in a manner similar to the processing of step S14 in FIG. 2.

Thereafter, the processing proceeds to step S114.

In contrast, the recognition result is determined to need no modification in step S106 or S112, the processing proceeds to step S114.

In step S114, the recognition result is confirmed in a manner similar to the processing of step S15 in FIG. 2.

In step S115, in step S116 in FIG. 2, it is determined whether or not the voice recognition is to be continued. In a case where the voice recognition is determined to be continued, the processing returns to step S102.

Thereafter, the pieces of processing of steps S102 to S115 are repeatedly executed until the voice recognition is determined to be finished in step S115.

In contrast, the voice recognition is determined to be finished in step S115, the processing of the client 11 is finished.

(Processing of Server 12)

Next, the processing executed by the server 12 will be described in correspondence with the processing of the client 11 in FIG. 7 with reference to the flowchart of FIG. 8.

In step S151, it is determined whether or not execution of voice recognition is requested in a manner similar to the processing of step S51 in FIG. 4. The determination processing of step S151 is repeatedly executed at predetermined timing until it is determined that the execution of voice recognition is requested. In a case where the execution of voice recognition is determined to be executed, the processing proceeds to step S152.

In step S152, the voice recognition is performed in a manner similar to the processing of step S52 in FIG. 4.

In step S153, a presentation control unit 72 determines whether or not it is the first trial on the basis of additional information data of a voice recognition starting command. In a case of determining that it is the first trial, the processing proceeds to step S154.

In step S154, the presentation control unit 72 sets an initial value of a separation mode. For example, the presentation control unit 72 sets the initial value of the separation mode by a method similar to a method executed by the client 11 in step S2 in FIG. 2, on the basis of a detection result of execution context contained in the additional information data of the voice recognition starting command.

Thereafter, the processing proceeds to step S158.

In contrast, in a case of determining, in step S153, that it is the second or subsequent trial, the processing proceeds to step S155.

In step S155, the presentation control unit 72 determines whether or not change to the manual input mode is to be performed. Note that the determination condition in step S155 is similar to that in step S8 in FIG. 2. In a case where the change to the manual input mode is determined not to be performed, the processing then proceeds to step S156.

In step S156, the presentation control unit 72 changes the separation mode as necessary. Specifically, in a case where the voice recognition has already been tried a predetermined number of times in the current separation mode, the presentation control unit 72 changes the separation mode to the mode next to the current mode. In contrast, in a case where the voice recognition has not yet been tried a predetermined number of times in the current separation mode, the presentation control unit 72 changes the separation mode to the mode next to the current mode.

Thereafter, the processing proceeds to step S158.

In contrast, in a case where the change to the manual input mode is determined, in step S155, to be performed, the processing proceeds to step S157.

In step S157, the presentation control unit 72 performs setting to the manual input mode.

Thereafter, the processing proceeds to step S158.

In step S158, the presentation control unit 72 transmits a recognition result. Specifically, the presentation control unit 72 generates recognition result data containing the recognition result and separation control information. Note that the recognition result data can contain, for example, the reliability of the recognition result, and the like. The presentation control unit 72 transmits the recognition result data to the client 11 via the communication unit 61.

Thereafter, the processing returns to step S151, and the pieces of processing after step S151 are executed.

Figure 7:
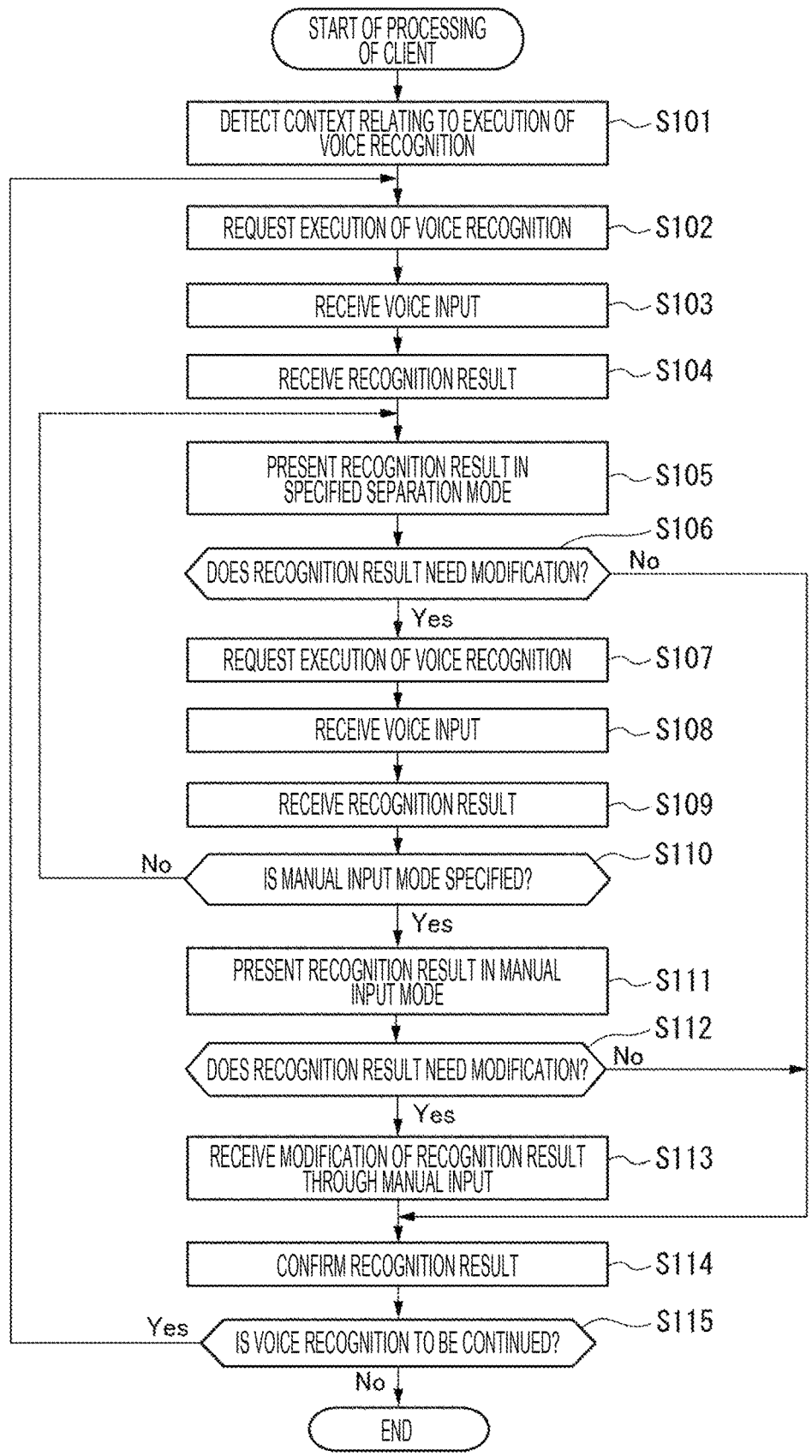
FIG. 7 is a flowchart for illustrating a second embodiment of processing of the client.
Figure 8:
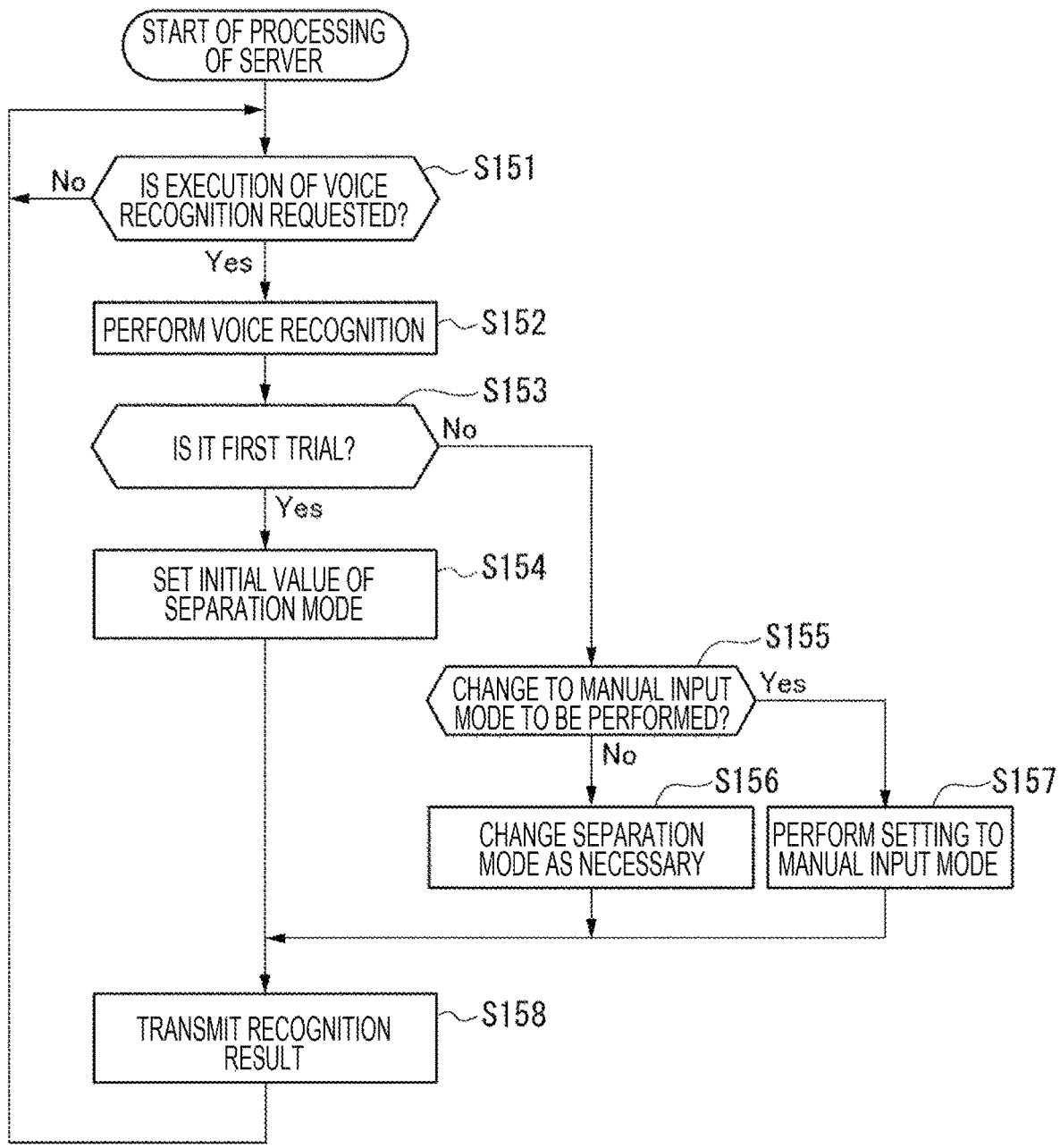
FIG. 8 is a flowchart for illustrating a second embodiment of processing of the server.

FIGS. 9 and 10 illustrate examples of data transmitted and received between the client 11 and the server 12 in the pieces of processing of FIGS. 7 and 8.

In the example of FIG. 9, a voice recognition starting command containing additional information data is transmitted from the client 11 to the server 12. The additional information data is compliant with, for example, JSON, and contains trial_num and session_id. The session_id is an ID for identifying a session of voice recognition. The same session_id is set in a session of voice recognition for the same sentence, and different session_id is set between sessions of voice recognition for another sentence. The trial_num indicates the number of trials of voice recognition within the same session. This example represents trial_num=3, indicating that this is the third trial of voice recognition in the same session, and a desired recognition result has not been obtained in the past two trials.

Note that, although not illustrated, the additional information data contains, for example, a detection result, which the client 11 provides, of execution context.

In contrast, recognition result data is transmitted from the server 12 to the client 11. The recognition result data is compliant with, for example, JSON, and contains result and separation_mode. The result indicates the recognition result. In the example, the recognition result (recognized sentence) set in the result is not separated. The separation_mode is separation control information indicating a separation mode. A separation at a time of presenting the recognition result in the client 11 is controlled on the basis of the separation_mode. In other words, the client 11 separately presents the recognition result set in the result in accordance with the separation mode set in the separation_mode.

In the example of FIG. 10, a voice recognition starting command containing additional information data similar to that in the example of FIG. 9 is transmitted from the client 11 to the server 12. Note that, although not illustrated, the additional information data contains, for example, a detection result, which the client 11 provides, of execution context.

In contrast, recognition result data is transmitted from the server 12 to the client 11. The recognition result data is compliant with, for example, JSON, and contains result. The result indicates the recognition result. In the example, the recognition result (recognized sentence) set in the result is separated in accordance with a separation mode. In this configuration, the client 11 can present the recognition result in the separation mode set by the server 12 by presenting the recognition result while keeping the separation indicated by the result of the recognition result data. In the example, the separation of the recognition result set in the result thus corresponds to the separation control information.

In this way, the server 12 can also control the separation mode of the client 11.

Note that, for example, in a case where the same user is likely to use a plurality of devices, and in a case where difference in methods of inputting voice and in contents is small between users (for example, in voice input to a web search browser), and a method of controlling the separation mode can be developed to other users, the separation mode of each of the client 11 is preferably controlled on the server 12 side.

In contrast, for example, in a case where the difference in methods of inputting voice and in contents is large between users, the separation mode is preferably controlled on the client 11 side. For example, in a case where the client 11 is a game console, the separation mode is assumed to be controlled on the client 11 side since the difference in methods of inputting voice and in contents is large between users and a memory area for controlling the separation mode is likely to be secured.

2. Variations

Variations of the above-described embodiments of the present technology will now be described.

2-1. Variation Relating to Configuration Example of System

The configuration example of the information processing system 10 in FIG. 1 is one example thereof, and can be changed as necessary.

For example, part of function of the client 11 can be provided in the server 12, and part of function of a server 12 can be provided in the client 11.

Furthermore, for example, the client 11 and the server 12 can be integrated to be one device and perform the above-described processing.

Moreover, for example, control of a separation mode may be shared between the client 11 and the server 12.

Furthermore, for example, the client 11 may transmit data relating to context (for example, voice data and sensor data) to the server 12, and the server 12 may detect the context relating to voice recognition.

2-2. Variation Relating to Method of Presenting Recognition Result

For example, the present technology can be applied also to a case of presenting a recognized sentence without a separation.

For example, as illustrated in FIG. 11, in a case where a recognized sentence "I sue a person with a red shirt" is obtained by the server 12 for input voice "I see a person with a red shirt", the recognized sentence is presented as it is first in the client 11.

Next, the user deletes "sue" of the presented recognition sentence, and reinputs voice "see". For this operation, in a case where a recognition result "sue" is obtained, "sue" newly obtained as the recognition result is inserted at the position of the deleted "sue" to be presented. At the time, a cursor 131 is displayed at the position of "I sue", and a message 132 is displayed. The cursor 131 indicates a range for which reinput of voice is recommended. The message 132 indicates that inputting a phrase before "sue" (for example, "I") together improves recognition accuracy.

The user then deletes "I sue" of the presented recognition sentence, and reinputs voice "I see". For this operation, in a case where a recognition result "I sue" is obtained, "I sue" newly obtained as the recognition result is inserted at the position of the deleted "I sue" to be presented. At the time, a cursor 133 is displayed at the position of "I sue a person", and a message 134 is displayed. The cursor 133 indicates a range for which reinput of voice is recommended. The message 134 indicates that inputting a word before and after "sue" (for example, "I" and "a person") together improves recognition accuracy.

The user then deletes "I sue a person" of the presented recognition sentence, and reinputs voice "I see a person". For this operation, in a case where a recognition result "I sue a person" is obtained, "I sue a person" newly obtained as the recognition result is inserted at the position of the deleted "I sue a person" to be presented. At the time, a cursor 135 is displayed at the position of "I sue a person". The cursor 135 indicates a range for which reinput of voice is recommended. Furthermore, in a case where the same mistake is repeated a certain number of times or more, a message 136 is displayed. The message 136 indicates that a paraphrase of part indicated by the cursor 135 into another expression and input of the expression are recommended in order to obtain a correct recognition result.

In this way, even in a case of presenting a recognized sentence without a separation, effect similar to that in the above-described method of presentation can be obtained by changing a range for which reinput of voice is recommended and presenting the changed range.

Note that the method of presentation is used in a case where, for example, voice recognition engines for dai vocabulary and one character are used, and a one-character mode that uses the voice recognition engine for one character is likely to be frequently performed by different use by the user.

Furthermore, although the recognized sentence is presented without a separation in the method of presentation, the separation of the recognized sentence can be considered to be partially changed by changing the range for which reinput of voice is recommended.

Furthermore, for example, the present technology can be applied also to a case where a recognized sentence is presented not visually but by voice.

For example, in a case where a recognized sentence "I sue a person with a red shirt" is obtained, pieces of voice "One, I sue", "Two, a person", "Three, with", and "Four, a red shirt" are output as a recognition result. In other words, the recognized sentence is presented by voice with the recognized sentence separated on modification-unit basis, and with the number for uniquely identifying each modification unit added before each modification unit. Furthermore, after the recognition sentence is output to the end, a voice message prompting the user to confirmation, such as "Is everything okay for you?", is output.

For this operation, the user specifies, by number, part desired to be modified by inputting voice, for example, "change one". Thereafter, voice recognition for the reinput voice is performed by reinputting the voice of the part specified by the user.

Next, for example, the separation of the recognized sentence is changed like "One, I sue a person" and "Two, with a red shirt", and the number for uniquely identifying each modification unit is added before each modification unit. The recognized sentence is then presented by voice. Furthermore, after the recognition sentence is output to the end, a voice message prompting the user to confirmation, such as "Is everything okay for you?", is output.

In this way, the separation of the recognized sentence is elongated as the number of trials increases in a similar manner to the case of visually presenting a recognized sentence. In a case where a desired recognition result cannot be obtained and the recognized sentence finally can no longer be separated, the input mode is then changed to the one-character mode. A voice message prompting input of a spelling of a phrase to be input by one character, for example, "Please spell your words" is then output.

In this way, also in a case of presenting the recognized sentence by voice, the recognized sentence can be presented separately on modification-unit basis, and modified in each modification unit, in a manner similar to the case of visually presenting the recognized sentence.

Note that, overly separated recognized sentence leads to a huge information amount in reading of the recognized sentence. To avoid this situation, the number of the separation of the recognized sentence may be restricted by providing, for example, the maximum number for separations. Furthermore, for example, to avoid too many numbers of trials of the voice recognition, for example, the number of trials may be restricted by providing the maximum number of trials, and transition to the one-character mode may be performed after the number of trials has reached the maximum number of trials.

2-3. Variation Relating to Separation Mode

The type and transition method of a separation mode are not limited to the above-described examples, and can be optionally changed.

For example, instead of immediate transition to a manual input mode after a one-character mode, transition to another separation mode such as a word division mode may be performed.

Furthermore, for example, transition to the one-character mode may be performed after a clause/phrase connection mode.

Moreover, for example, the transition method of the separation mode may be changed on the basis of execution context.

Furthermore, for example, the transition of the separation mode may be controlled on the basis of the number of trials and context relating to voice recognition other than the execution context. For example, the transition of the separation mode may be controlled on the basis of, for example, the reliability of the voice recognition and the length of a sentence for which the voice recognition is performed.

Moreover, in the above-described description, an example in which a separation of the recognized sentence is elongated as the number of trials increases. In contrast, the separation of the recognized sentence may be shortened.

Furthermore, the types of the above-described separation mode may be increased or decreased. For example, the recognized sentence may be separated at the position of the phrase ending with a voiced sound.

3. Applications

The above-described series of pieces of processing can be executed by hardware and software. In a case where the series of pieces of processing is executed by software, a program constituting the software is installed in a computer. Here, the computer includes a computer incorporated in dedicated hardware and, for example, a general-purpose personal computer capable of executing various functions by installing various programs.

Figure 12:
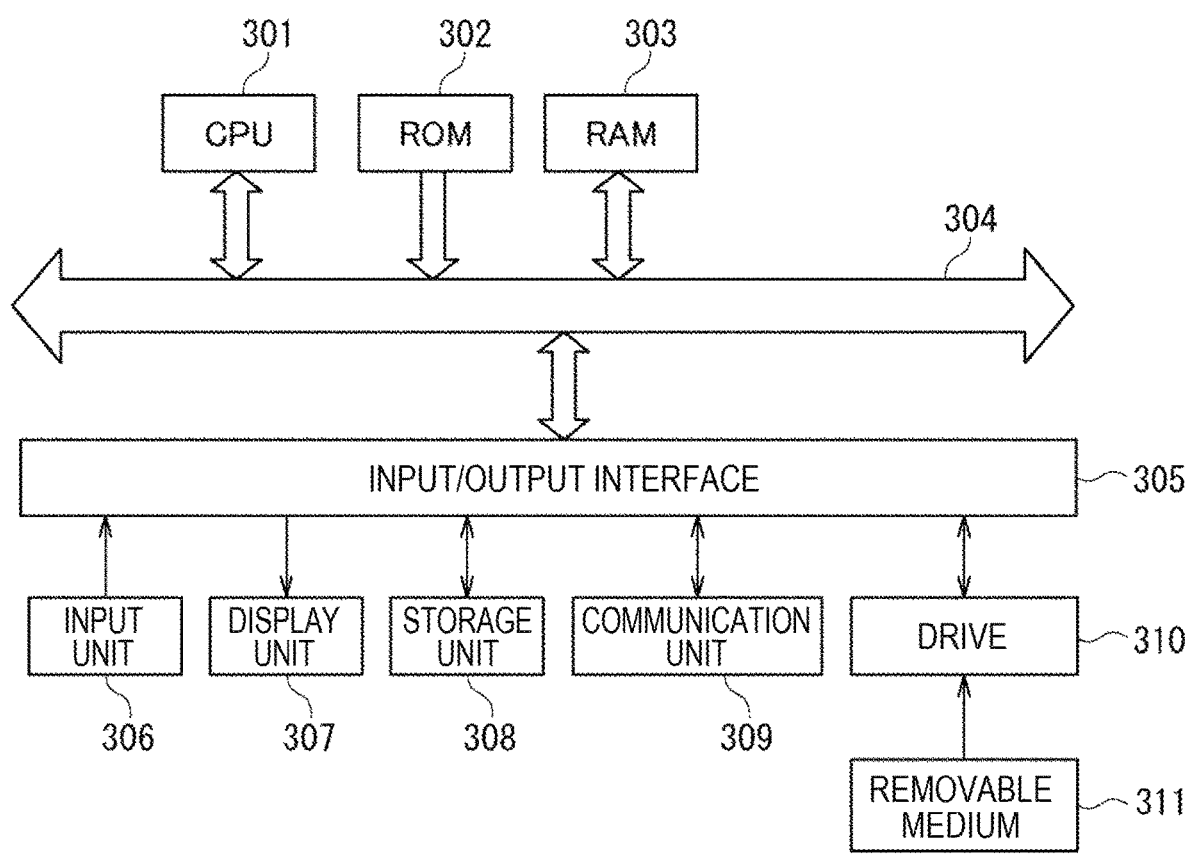
FIG. 12 is a block diagram illustrating a configuration example of a computer.

FIG. 12 is a block diagram illustrating a configuration example of hardware of a computer that executes the above-described series of pieces of processing with a program.

In the computer, a central processing unit (CPU) 301, a read only memory (ROM) 302, and a random access memory (RAM) 303 are mutually connected via a bus 304.

An input/output interface 305 is also connected to the bus 304. An input unit 306, an output unit 307, a storage unit 308, a communication unit 309, and a drive 310 are connected to the input/output interface 305.

The input unit 306 includes a keyboard, a mouse, and a microphone. The output unit 307 includes a display and a speaker. The storage unit 308 includes a hard disk and a nonvolatile memory. The communication unit 309 includes a network interface. The drive 310 drives a removable medium 311 such as a magnetic disk, an optical disk, a magneto-optical disk, and a semiconductor memory.

In the computer of the above-mentioned configuration, the above-described series of pieces of processing is performed by the CPU 301, for example, loading a program stored in the storage unit 308 to the RAM 303 via the input/output interface 305 and the bus 304 and executing the program.

The program executed by the computer (CPU 301) can be provided with the program stored in the removable medium 311 as, for example, a package medium. Furthermore, the program can be provided via a wired or wireless transmission medium such as a local area network, the Internet, and digital satellite broadcasting.

In the computer, the program can be installed in the storage unit 308 via the input/output interface 305 by mounting the removable medium 311 in the drive 310. Furthermore, the program can be received by the communication unit 309 via the wired or wireless transmission medium, and installed in the storage unit 308. In addition, the program can be previously installed in the ROM 302 and the storage unit 308.

Note that, in the program executed by the computer, processing may be performed chronologically in order of the description of the specification, or may be performed in parallel, or at necessary timing such as at a time when a call is performed.

Furthermore, a plurality of computers may cooperate to perform the above-described processing. Then, a computer system is constituted by a single or a plurality of computers that perform the above-described processing.

Furthermore, in the specification, the system means a set of multiple components (such as devices and modules (parts)), and it does not matter whether or not all components are placed in the same housing. Consequently, both of a plurality of devices that are housed in separate housings and connected via a network, and a single device with a plurality of modules housed in a single housing are defined as a system.

Moreover, the embodiment of the present technology is not limited to the above-described embodiments, and various changes are possible without departing from the spirit of the present technology.

For example, the present technology can adopt a configuration of cloud computing, in which a plurality of devices shares a single function via a network, and performs processing in cooperation.

Furthermore, in addition that a single device can perform each of the steps described in the above-described flowcharts, a plurality of devices can share and perform each of the steps.

Moreover, in a case where a single step includes a plurality of pieces of processing, in addition that a single device can perform the plurality of pieces of processing contained in the single step, a plurality of devices can share and perform the plurality of pieces of processing.

Furthermore, the effects described in the specification are not limitations but merely examples, and other effects may be provided.

Furthermore, for example, the present technology can also have configurations as follows.

(1)

An information processing device including a presentation control unit that controls a separation at a time of presenting a recognition result of voice recognition on the basis of context relating to voice recognition.

(2)

The information processing device according to the (1), in which a unit in which the recognition result is allowed to be modified is determined by a separation of the recognition result.

(3)

The information processing device according to the (1) or (2), further including a voice recognition unit, in which the presentation control unit controls a separation of the recognition result presented by the voice recognition unit.

(4)

The information processing device according to the (3), in which the presentation control unit generates control information for controlling a separation of the recognition result, and outputs the recognition result and the control information.

(5)

The information processing device according to the (4), further including a communication unit that receives input voice from another information processing device, and transmits the recognition result and the control information to the other information processing device, in which the voice recognition unit performs voice recognition for the input voice, and the presentation control unit controls a separation at a time of presenting the recognition result in the other information processing device on the basis of the control information.

(6)

The information processing device according to the (5), in which the communication unit receives data indicating the context from the other information processing device, and the presentation control unit controls a separation at a time of presenting the recognition result in the other information processing device on the basis of data indicating the context.

(7)

The information processing device according to the (3), further including a communication unit in which the communication unit receives input voice and control information for controlling a separation of the recognition result from another information processing device, the voice recognition unit performs voice recognition for the input voice, the presentation control unit separates the recognition result presented by the voice recognition unit on the basis of the control information, and the communication unit transmits the recognition result separated by the presentation control unit to the other information processing device.

(8)

The information processing device according to the (1) or (2), further including a communication unit that transmits input voice to another information processing device, and receives the recognition result obtained by performing voice recognition for the input voice from the other information processing device, in which the presentation control unit controls a separation at a time of presenting the recognition result received from the other information processing device.

(9)

The information processing device according to the (8), in which the communication unit receives control information for controlling a separation of the recognition result from the other information processing device, and the presentation control unit controls a separation at a time of presenting the recognition result received from the other information processing device on the basis of the control information.

(10)

The information processing device according to the (8), in which the communication unit transmits control information for controlling a separation of the recognition result to the other information processing device, and receives the recognition result separated on the basis of the control information from the other information processing device, and the presentation control unit controls presentation of the recognition result separated by the other information processing device.

(11)

The information processing device according to any of the (1) to (10), in which the context contains the number of trials of voice recognition.

(12)

The information processing device according to the (11), in which the presentation control unit elongates a separation of the recognition result as the number of trials increases.

(13)

The information processing device according to the (11), in which the presentation control unit shortens a separation of the recognition result as the number of trials increases.

(14)

The information processing device according to any one of the (1) to (13), in which the context contains at least one of a noise environment at a time of inputting voice, or a use of voice recognition.

(15)

An information processing method including a presentation control step of controlling a separation at a time of presenting a recognition result of voice recognition on the basis of context relating to voice recognition.

REFERENCE SIGNS LIST

10 Information processing system
11 Client
12 Server
21 Voice input unit
23 Display unit
24 Presentation unit
25 Sensor unit
26 Communication unit
27 Control unit
41 Voice recognition control unit
42 Presentation control unit
43 Context detection unit
61 Communication unit
62 Control unit
71 Voice recognition unit
72 Presentation control unit

The invention claimed is:

1. An information processing device comprising:
a presentation control unit configured to control a separation at a time of presenting a recognition result of voice recognition based on context relating to voice recognition,
wherein the context includes a number of trials of voice recognition, and
wherein the presentation control unit is implemented via at least one processor.

2. The information processing device according to claim 1,
wherein a unit in which the recognition result is allowed to be modified is determined by the separation of the recognition result.

3. The information processing device according to claim 1, further comprising:
a voice recognition unit,
wherein the presentation control unit controls the separation of the recognition result presented by the voice recognition unit, and
wherein the voice recognition unit is implemented via at least one processor.

4. The information processing device according to claim 3,
wherein the presentation control unit is further configured to
generate control information for controlling the separation of the recognition result, and
output the recognition result and the control information.

5. The information processing device according to claim 4, further comprising:
a communication unit configured to
receive input voice from another information processing device, and transmit the recognition result and the control information to the other information processing device,
wherein the voice recognition unit is configured to perform voice recognition for the input voice, the presentation control unit controls the separation at the time of presenting the recognition result in the other information processing device based on the control information, and wherein the communication unit is implemented via at least one processor.

6. The information processing device according to claim 5, wherein the communication unit is further configured to receive data indicating the context from the other information processing device, and wherein the presentation control unit controls the separation at the time of presenting the recognition result in the other information processing device based on data indicating the context.

7. The information processing device according to claim 3, further comprising:

a communication unit, wherein the communication unit receives input voice and control information for controlling a separation of the recognition result from another information processing device, wherein the voice recognition unit performs voice recognition for the input voice, wherein the presentation control unit separates the recognition result presented by the voice recognition unit based on the control information, wherein the communication unit transmits the recognition result separated by the presentation control unit to the other information processing device, and wherein the communication unit is implemented via at least one processor.

8. The information processing device according to claim 1, further comprising:

a communication unit configured to transmit input voice to another information processing device, and receive the recognition result obtained by performing voice recognition for the input voice from the other information processing device, wherein the presentation control unit controls the separation at the time of presenting the recognition result received from the other information processing device, and wherein the communication unit is implemented via at least one processor.

9. The information processing device according to claim 8, wherein the communication unit is further configured to receive control information for controlling the separation of the recognition result from the other information processing device, and wherein the presentation control unit controls the separation at the time of presenting the recognition result received from the other information processing device based on the control information.

10. The information processing device according to claim 8, wherein the communication unit is further configured to transmit control information for controlling the separation of the recognition result to the other information processing device, and receive the recognition result separated based on the control information from the other information processing device, and the presentation control unit controls presentation of the recognition result separated by the other information processing device.

11. The information processing device according to claim 1, wherein the presentation control unit is further configured to elongate the separation of the recognition result as the number of trials increases.

12. The information processing device according to claim 1, wherein the presentation control unit is further configured to shorten the separation of the recognition result as the number of trials increases.

13. The information processing device according to claim 1, wherein the context further includes at least one of a noise environment at a time of inputting voice or a use of voice recognition.

14. An information processing method comprising:

controlling a separation at a time of presenting a recognition result of voice recognition based on context relating to voice recognition, wherein the context includes a number of trials of voice recognition.

* * * * *